United States Patent [19]
Quick

[11] 3,801,138
[45] Apr. 2, 1974

[54] TRAVEL HOME WITH CAR-TOP HITCH

[75] Inventor: Robert G. Quick, Manlius, N.Y.

[73] Assignee: Hy-Rider Inc., Trout Creek, N.Y.

[22] Filed: June 25, 1973

[21] Appl. No.: 373,150

Related U.S. Application Data

[62] Division of Ser. No. 199,920, Nov. 18, 1971.

[52] U.S. Cl...... 280/478 R, 280/423 R, 280/438 R, 280/456, 280/491 R, 280/422
[51] Int. Cl.......................... B62d 53/00, B60d 1/08
[58] Field of Search........ 280/478 R, 478 A, 478 B, 280/479 R, 423 R, 456, 438 R

[56] References Cited
UNITED STATES PATENTS

| | | | |
|---|---|---|---|
| 2,488,805 | 11/1949 | Clark et al. | 280/478 B X |
| 2,703,243 | 3/1955 | Clark | 280/478 B X |
| 3,383,119 | 5/1968 | Carroll | 280/423 R X |
| 3,722,917 | 3/1973 | Mims et al. | 280/423 R |

FOREIGN PATENTS OR APPLICATIONS

| | | | |
|---|---|---|---|
| 436,748 | 11/1926 | Germany | 280/478 R |
| 445,103 | 5/1927 | Germany | 280/478 R |

Primary Examiner—Leo Friaglia
Attorney, Agent, or Firm—Bruns & Jenney

[57] ABSTRACT

A car-towed trailer has its foreportion segmented in three horizontally extending sections, the two lower sections being telescopically slideable up into the top section by hydraulic means so as to overlie the tow-car which has an ear at each side projecting up through the roof at the back of the driver's seat. The bottom telescoping section has a pendant hitch tube oscillatably secured thereto and rotatably secured to an underlying crossbar having a pair of forwardly projecting ears at each side adapted to extend along each side of a car-roof ear and be secured thereto by a clevis pin through the ears. The rear portion does not telescope and has wheels rearward of the foreportion spaced from the connected tow-car so that the tow-car can be driven forward or backed under the overlying foreportion. Support legs attached to the upper foreportion section may be folded up into hidden position at each side while traveling or folded down and hydraulically extended to support the foreportion when the tow-car is unhitched. The trailer-supported hitch crossbar has a pendant headed stud extending down through slots in one end of each of two forwardly extendable alignment arms whose forward ends carry pendant pins insertable in holes in a cross plate between the car-roof ears, the arm slots being of such length as to move the trailer foreportion transversely for guiding the ears into position when the car is moved toward the trailer.

3 Claims, 16 Drawing Figures

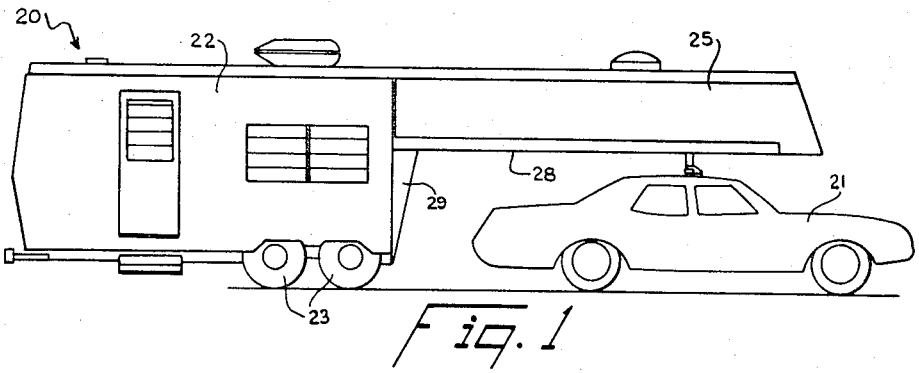
Fig. 1
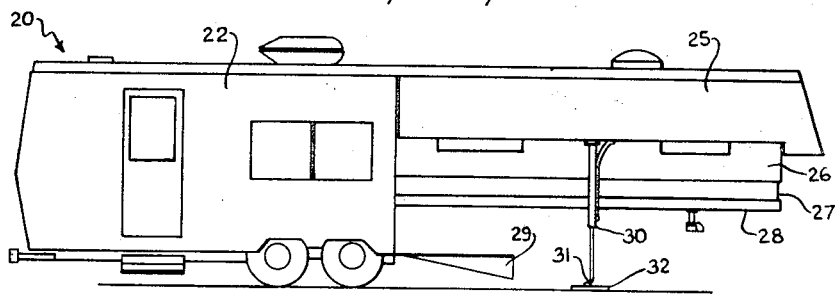
Fig. 2
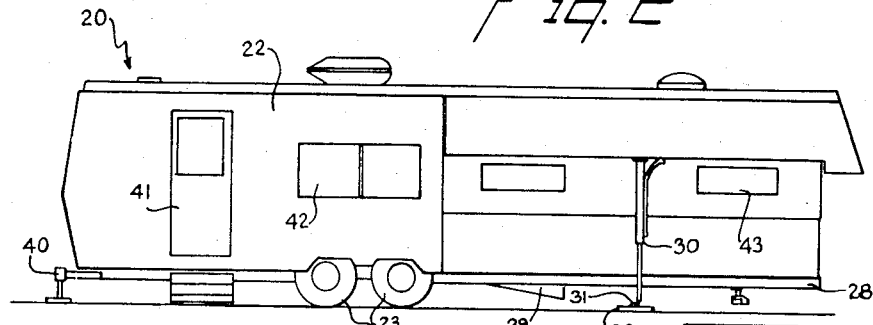
Fig. 3
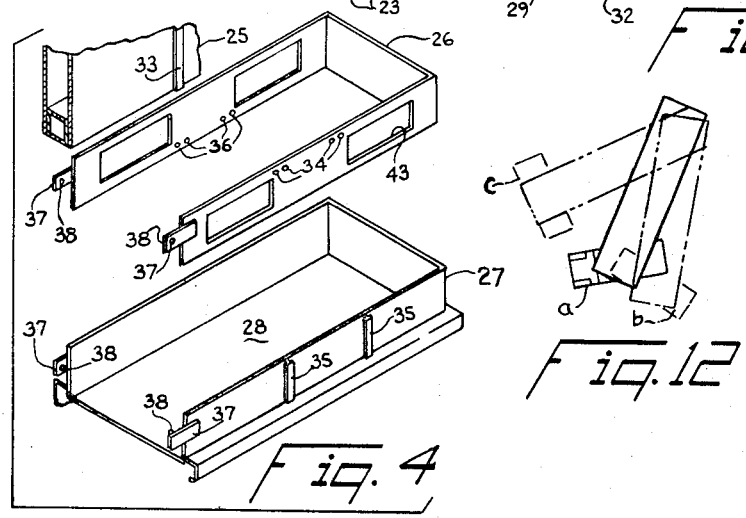
Fig. 4
Fig. 12

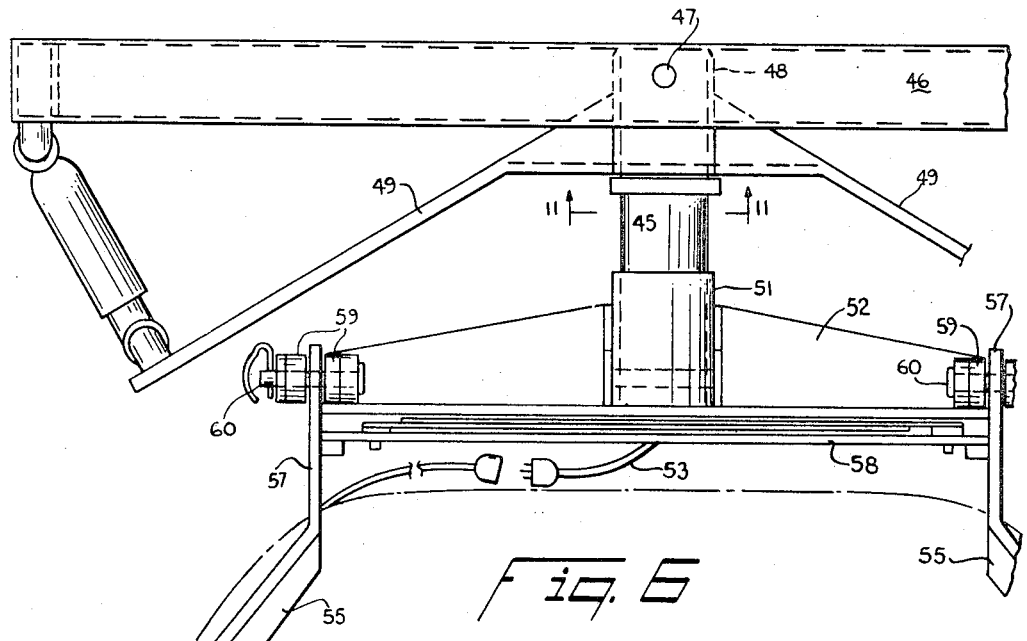
Fig. 6
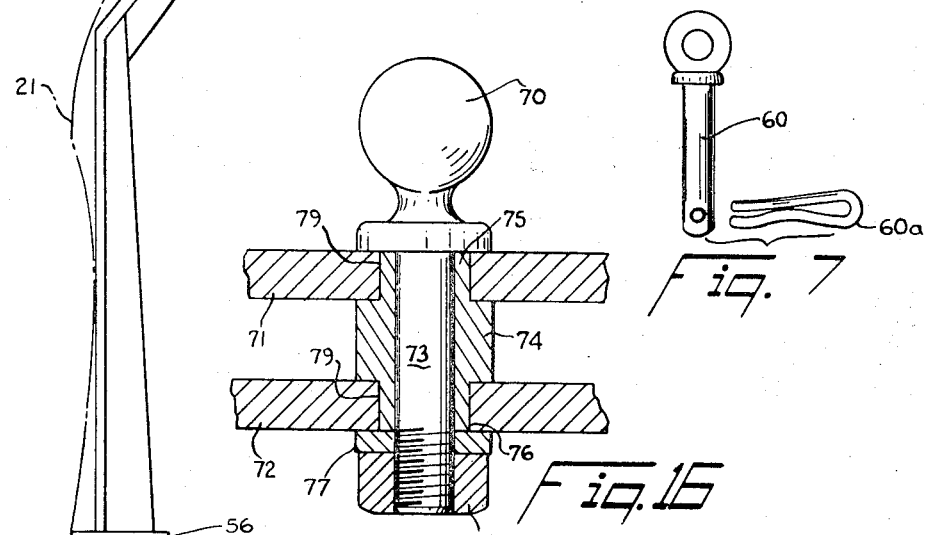
Fig. 7
Fig. 16
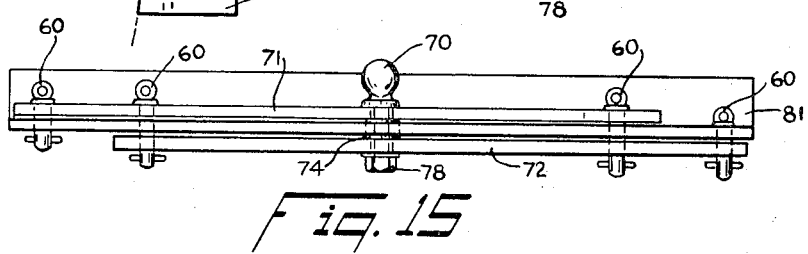
Fig. 15

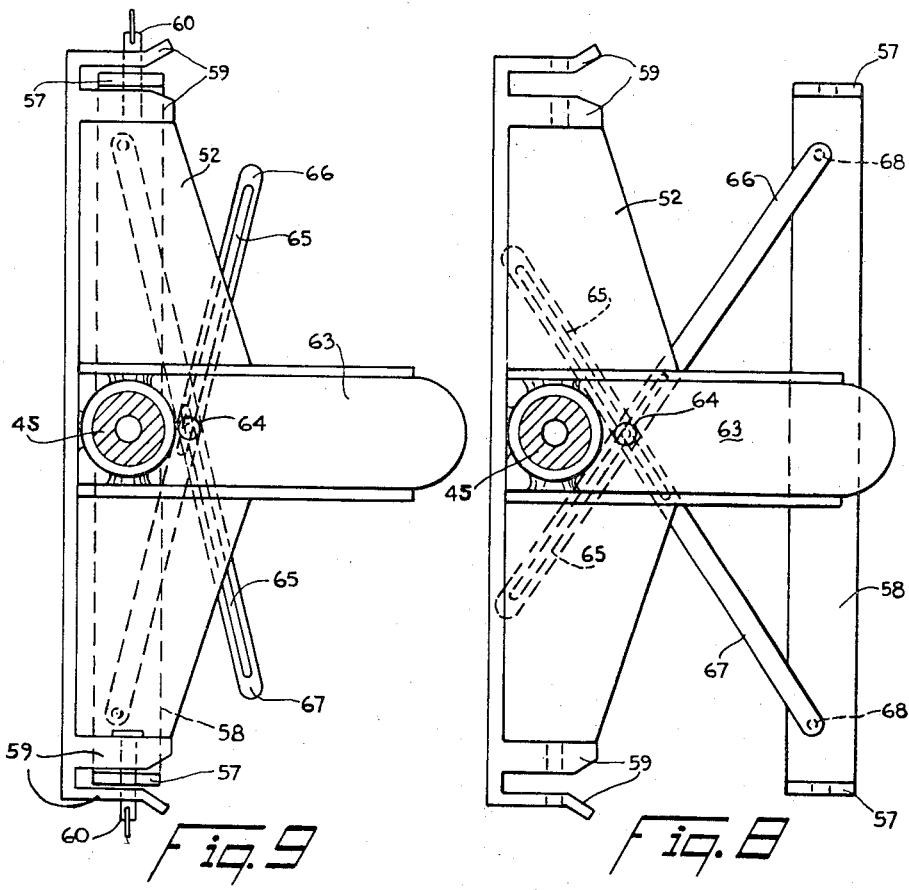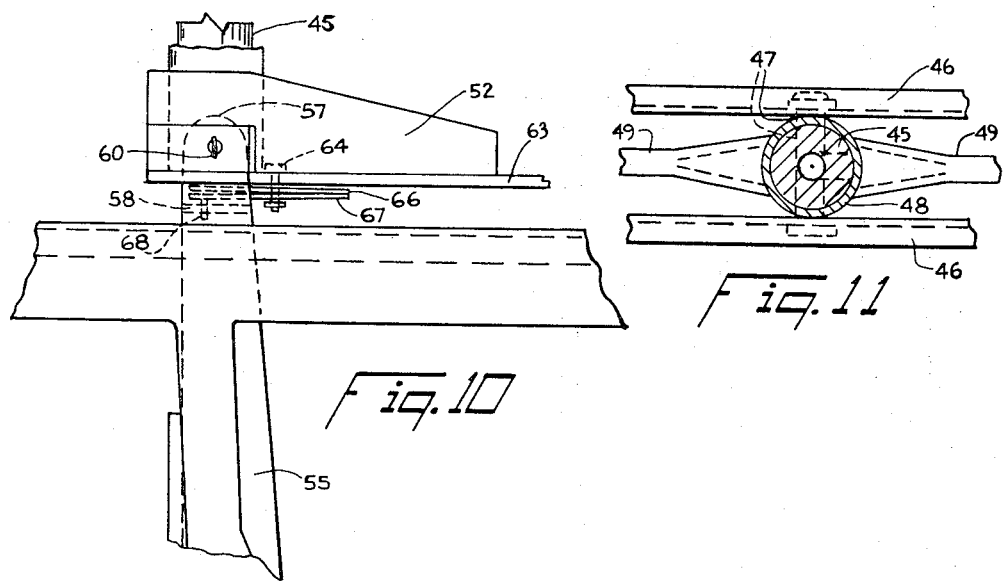

TRAVEL HOME WITH CAR-TOP HITCH

This is a division of U.S. Pat. application Ser. No. 199,920, filed Nov. 18, 1971.

BACKGROUND OF THE INVENTION

This invention relates to trailer houses having a set of wheels under their rear portions and having a foreportion overlying the towing vehicle. More particularly it relates to such a house adapted to be towed by a modified four-door sedan, has a novel self centering hitch connecting the trailer foreportion to the roof of the sedan, and has powered supporting means for the foreportion and telescoping sections lowerable under the foreportion when the tow-car is unhitched.

Prior art trailer houses having overlying foreportions have usually had a hitch connection adapted to be supported in the cargo space of a small truck or luggage space of an auto. Such hitches have usually been standard ball and socket hitches or, when a hitch having a pivot about a single transverse axis is used, pivoted trailing wheels are required.

Prior art trailers having an overlying foreportion adapted to be secured to the roof of a car have employed a ball and socket hitch with its car-attached portion removably secured to the car like a luggage rack. Truck mounted camper bodies have had telescoping sides adapting the body to be raised above the truck bed when camping and to be lowered while traveling but not house trailers having a tow-car overlying foreportion have had telescoping sections lowerable from the foreportion for providing living space under the overlying portion when the tow-car is unhitched.

The great majority of house trailers having sufficient living space to be classed as traveling homes, rather than campers, occupy 54 feet or more of roadspace, including hitch tongue and tow-car, are hard to maneuver on the road or to park, are subject to road sway and wind sway requiring constant steering compensation, and usually require a weight distributing hitch attached to the tow car.

SUMMARY OF THE INVENTION

The present invention provides a travel home and tow-car of the order of 37 feet in overall road length, about equal to that of a bus conversion motor home having comparable living space, but with separate travel car when the tow-car is unhitched. The occupied road length is about equal to that of a tow car and conventional trailer 17 feet long with less than half the living space.

The compactness is achieved by making the foreportion of the trailer in three horizontal layers, the lower two being capable of being telescoped upward into the upper or roof layer which is thus adapted to overlie the tow-car. One portion of the hitch is secured to the floor of the lower layer which, when raised, is locked in place and positioned above the roof of the tow-car. The other portion of the hitch is secured to the tow-car and comprises, in addition to the usual spring-strengthening means, interior reinforcing members added on each side of the car back of the driver's seat secured to the vertical member of the car between front and rear doors. The lower ends of the reinforcing members are provided with feet secured to the car frame under the floor of the car and each member terminates at its upper end in an ear projecting up through the car roof. A cross-brace secured to each ear extends between the ears above the car roof and can also serve as a roll-bar or portion of a luggage rack.

The upper portion of the hitch secured to the bottom of the overlying foreportion of the trailer comprises a vertically disposed hitch tube having its upper end oscillatably secured to the overlying foreportion by a longitudinally extending pin to provide for transverse rocking motion of the trailer with respect to the tow car. The lower end of the hitch tube is rotatably received and secured in a suitable bearing at the center of a hitch crossmember to provide for lateral turning of the tow car with respect to the trailer. The hitch crossmember is provided at each end with a pair of spaced forwardly extending ears for receiving therebetween an upwardly projecting ear from the car top, the ears being secured together by a clevis pin, providing a pivotal connection allowing front to rear rocking of the tow car with respect to the trailer and distributing the weight of the forward end of the trailer to all four wheels of the tow car.

The rear portion of the trailer, integral with the roof portion of the foreportion is of standard height and has trailer wheels, preferably in the form of a 4-wheel carriage, at its forward end. A closure member for this forward end can be swung down out of the way when the telescoping sections of the foreportion are lowered.

This arrangement provides room in the rear portion for kitchen including stove, refrigerator, freezer and dishwasher, closet space, dining area and bathroom facilities, all the facilities ordinarily used during driving hours. The telescoping foreportion provides room for living area furniture, such as beds, couches, dressers, chairs, desks and other items ordinarily used when parked. All the furniture in the living area can be 30 inches in height or less so that when the floor section is raised there is room under the roof of the upper section for all the furniture. The middle section is provided with windows for the living area.

Although intended for travel home use, it will be understood that the rear portion may be used for animal or other large object transportation or mercantile displays while the foreportion may provide storage room for small articles or space for a sales room.

The foreportion of the trailer comprises more than half the total length of the trailer and projects overhead in front of the driver but not sofar as to block his view. The hitch is at the approximate center of the tow-car eliminating the primary cause of side sway, and the hitch tube provides 360 degree range of movement around a vertical axis so that the car may be turned completely around when hitched without interference by the trailer and the tow-car may be driven ahead toward the trailer when parking or preparatory to hitching the trailer.

The lower two sections of the foreportion are telescoped up within the top section while traveling so that the portion of the trailer forward of the wheels presents only one third of the side expanse of a conventional trailer exposed to buffeting by wind or air disturbance by a passing vehicle. The portion to the rear of the trailer wheels has a side area larger than that of the raised foreportion so that too provides a counterbalance against side sway caused by wind buffeting being transmitted to the tow-car.

The longitudinal axis provided by the tube and pin connection between the trailer and its hitch provides a sufficient range of sway independent of the car but a sleeve around the hitch pin may carry transverse arms connected by shock absorbers to the sides of the trailer to dampen this movement.

The transverse axis provided by the clevis pins through the mating ears carried by the trailer-born portion of the hitch and the car-born hitch portions gives an ample range of up and down movement between car and trailer caused by any conceivable road irregularity to be met by reason of the space between the trailer foreportion and the car top occupied by the hitch. It will be noted also that the combination of the longitudinal and transverse axes connection between car and trailer will resist any tendency for the trailer to overturn the car if the trailer is swung with its longitudinal axis normal to that of the car.

The hitch is also provided with novel means for aligning the trailer-born portion of the hitch with the car-born portion prior to the clevis pins being inserted through the hitch ears.

The pendant crossmember of the trailer-born portion of the hitch is provided at its bottom with a horizontally disposed car-saver plate having a pendant headed stud or bolt which passes through slots at one end of each of two forwardly extendable aligning arms which are thereby supported extending horizontally under the plate. The other end of each aligning arm carries a pendant pin or stud which may be dropped through holes equidistant from the center of the cross brace between the car-born ears. As the tow-car approaches the trailer, the pendant stud slides in the slots of the arms, the slots being of such length that the trailer is moved sideways when the stud reaches the end of a slot to align the two portions of the hitch so that the clevis pins can be engaged in the sets of ears at each side of the hitch.

BRIEF DESCRIPTION OF THE DRAWINGS

FIG. 1 is a side elevational view of a trailer of the invention hitched to its tow-car for traveling;

FIG. 2 is a side elevational view of the trailer unhitched and supported at its foreportion for lowering the telescoped sections of the foreportion;

FIG. 3 is a side elevational view of the trailer in residence position with its telescoped sections lowered;

FIG. 4 is a fragmentary, diagrammatical, exploded view of the telescoping sections of the foreportion;

FIG. 6 is an enlarged, fragmentary front elevational view of the hitch and tow-car reinforcing members, the interior outline of the car being indicated in broken lines;

FIG. 7 is an enlarged exploded view of a clevis pin used in the hitch;

FIG. 8 is a plan view of the hitch showing the aligning arms prior to engagement of the two portions of the hitch;

FIG. 9 is a plan view of the hitch with the two portions engaged and locked;

FIG. 10 is a side elevational view thereof;

FIG. 11 is a sectional view on the line 11—11 of FIG. 6;

FIG. 12, on sheet 1 of the drawings, is a diagrammatical plan view of car and trailer making a K-turn;

FIG. 15, on sheet 3 of the drawings, is a front elevational view of the hitch shown in FIG. 13; and FIG. 16 is an enlarged sectional view of a portion of the hitch shown in FIG. 15.

DESCRIPTION OF THE PREFERRED EMBODIMENTS

Figure 5:
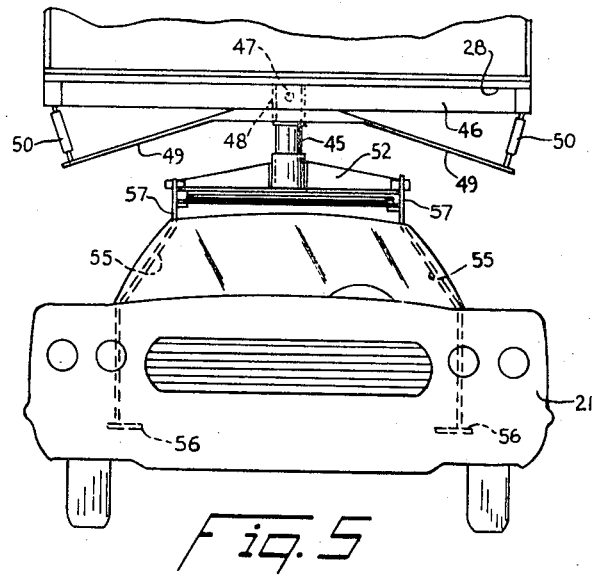
FIG. 5 is a front elevational view of the trailer and hitched tow-car of FIG. 1, the tow-car reinforcement being shown diagrammatically.

Referring to FIGS. 1-3, the trailer 20, shown hitched to a tow-car 21 in FIG. 1 and in residence condition in FIG. 3, has a rear portion 22 of conventional height provided with a set of trailer wheels 23, preferably four mounted on a conventional four wheel undercarriage at the forward end of portion 22. The trailer foreportion has an upper or roof section 25 integral with the rear portion 22, a middle section 26 and a lower portion 27 having a floor 28. Sections 26 and 27 are arranged to telescope up into section 25 while traveling, as shown in FIG. 1, and can be lowered, as shown in FIG. 2, to the residence position shown in FIG. 3.

The rear portion 22 has a front closure 29, preferably convexly curved from side to side, which may be lowered to the position shown in FIGS. 2 and 3. The foreportion upper section 25 is provided with a leg 30 at either side which can be folded up in a concealed position while traveling and folded down to support section 25 in residence condition. The lower portion of leg 30 telescopes within the upper cylinder portion and has a piston which can be hydraulically powered to extend the lower portion which terminates in a caster or wheel 31 usually resting on a metal plate or pad 32.

Referring to FIG. 4, upper section 25 is provided with a plurality of vertically extending, inwardly projecting dovetail members 33 which are engaged by pairs of outwardly projecting wheels 34 on the exterior of section 26 providing wheel and rail connections for the telescoping section 26. Similarly, the lower floor section 27 has a plurality of vertically extending, outwardly projecting dovetail members 35, and section 26 has cooperating pairs of inwardly projecting wheels 36 for telescopically securing together sections 26 and 27.

Sections 26 and 27 each have rearwardly projecting tongues 37 at each side provided with transversely projecting wheels 38 engaged in vertically extending tracks in the rear portion 22. It will be understood that means, not shown, are provided for raising sections 26 and 27 into telescoped position powered by a winch or, preferably, hydraulically powered. Means, not shown, for locking sections 26 and 27 into raised position are also provided.

The rear section 22 is also provided with conventional hinged support legs 40 at the rear which may be swung down to support the rear section independent of the springs for the wheels 23 as shown in FIG. 3. Section 22 is also provided with the usual door 41 and windows 42.

Interiorly, rear portion 22 contains all the facilities which might be used while traveling, including kitchen appliances, dining area, closet and bathroom facilities.

Section 26 contains window openings 43, section 25 has a rounded front end and section 27 has living space facilities, such as bed, or beds and couches, chairs and dressers, all supported on floor 28 and less than 30 inches in height so that all may be telescoped up into section 25.

Best seen in FIG. 5, a hitch tube 45 depends from floor 28, the tube being secured between two transversely extending channels 46 by a pin 47, as shown in FIG. 11, so as to be oscillatable from side to side. Supported on a sleeve 48 around tube 45, arms 49 extend to either side and terminate in shock absorbers 50 connected to the sides of floor 28 to dampen side sway of the trailer 20.

The lower end of the hitch tube 45 is rotatably secured in a bearing 51 at the center of a cross member 52 of the trailer connected portion of the hitch as best seen in FIG. 6.

A wire cable 53, providing connections to the trailer's running lights, battery and brakes may pass through the hitch tube 40, the cable preferably being provided with slip-ring connections within the tube.

The tow-car connected portion of the hitch comprises tow-car body reinforcing members 55 secured to each side of a car interior just back of the driver's seat along the post separating front and back windows in a four door sedan, the usual type of heavier car needed to tow a large trailer. Each reinforcing member 55 terminates at its lower end in a foot 56 secured to the frame of the car and at its upper end in an ear 57 projecting upward through the car roof as best seen in FIG. 6. Ears 57 are secured together by a cross-brace 58 which acts as a roll-over bar as well as strengthening the hitch.

The cross member 52 of the trailer-borne portion of the hitch has a pair of forwardly projecting ears 59 at either end, each pair being spaced apart for extending on either side of a car roof ear 57. The trailer portion of the hitch and the tow-car portion of the hitch are secured together with clevis pins 60, best seen in FIG. 7, at either side inserted through appropriate holes in the ears 57–59. Clevis pins 60 are locked in place by cotter pins 60a.

Referring now to FIGS. 8, 9 and 10, a novel aligning structure is shown for aligning the two portions of the hitch prior to the insertion of the clevis pins 60. The cross member 52 has at its center a forwardly projecting reinforced plate portion 63 designed to protect the roof of the tow-car during hitching and unhitching. Through this plate forward of the tube 40 a downwardly projecting headed stud or bolt 64 passes through an elongated slot 65 along one end of each of two aligning arms 66 and 67 and supports the arms 66 and 67 loosely below the plate 63 as shown.

As shown in FIG. 8, as the car-borne ears 57 and cross brace 58 approach the trailer portion of the hitch, it will be understood the arms 66 and 67 may be manually drawn forward, the bolt 64 sliding in the slots 65 in the arms and pendant pins 68 at the unslotted end of the arms can be inserted into appropriate holes in the cross brace 58 adjacent each ear 57, as shown. Then, when the tow-car is again moved toward the trailer, the bolt 64 will then reach the end of one slot 65 causing that aligning arm to move the trailer on its wheeled legs 30 transversely to align the two portions of the hitch, the slots 65 being of such length that the arms 66 and 67 align each ear 57 between its pair of ears 59 as the ears approach one another.

As hereinbefore noted, the spacing of the rearward portion 22 of the trailer from the tow-car 21 permits the car to be driven forward toward the trailer during the hitching operation giving the driver a good view of the trailer-borne portion of the hitch. The car-saver plate 63 of the hitch cross member 52 can thus be located and the driver can advance the car so that the car-borne cross brace 58 is under the plate 63. The arms 66 and 67 are then positioned with their pins 68 in the holes in cross member 58 and the car is then moved forward to automatically position ears 57 between the pairs of ears 59. Legs 30, which are hydraulically or mechanically extendable, can be shortened or lengthened if necessary to align the holes through the ears so that clevis pins 60 can be inserted through the ears and locked with pins 60a.

The lower portions of legs 30 are then telescoped up into the upper portions and the legs then swung up and locked out of sight. Rear supports 40 are swung up and the trailer-car combination is ready to move to another site.

In addition to the elimination of road sway and resistance to wind buffeting hereinbefore noted the trailer-car combination possesses other maneuverability characteristics. The hitch being at the center of the car, there is no initial turning of the trailer the wrong way on turns caused by a hitch secured to the overhang of the car rearward of its rear wheels. A K-turn may be executed in a transverse space little bigger than the trailer length, as shown in FIG. 12.

A car and trailer proceeding from top to bottom of the page as shown in full ines at "a" in FIG. 12 first turns in one direction while moving down the road. As the tow-car continues its turn beyond the perpendicular to the trailer, as shown at "b," the trailer's direction is reversed until the tow-car straightens out so as to be perpendicular to the trailer, as shown at "c," so that the car can continue ahead in the reverse direction from which it started.

When the car and trailer arrive at a spot for parking, the car need not back the trailer into position but may be maneuvered as in positions "a" and "b" of FIG. 12 so that the car is headed toward the trailer and the trailer is backed into position while the car moves forward.

When the trailer is in parked position, legs 30 are swung down and extended until the weight of the fore-portion of the trailer is taken from the springs of the tow-car and clevis pins 60 are removed. After the tow-car is driven away, closure 29 is swung down and sections 26 and 27 are unlocked from their elevated positions and allowed to descend by gravity to their lowered position. The rear legs 40 are then lowered and extended and trailer 20 is in residence condition and ready for use.

When ready for the road again the sections 26 and 27 are again raised and locked, rear legs 40 are raised and closure 29 swung up and locked in place. The tow-car 21 is then driven under portion 25 and hitched as described above.

Figure 13:
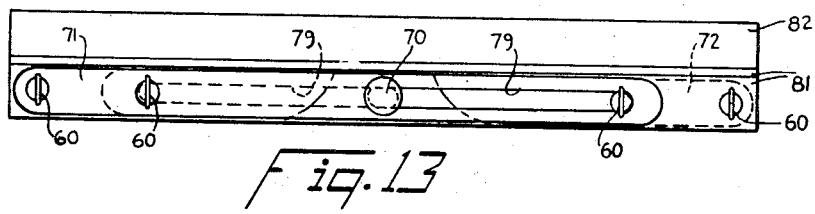
FIGS. 13 and 14, on sheet 2 of the drawings, are plan views of a ball and socket hitch employing the novel aligning arms of the invention, in hitched position and prior to hitching, respectively.
Figure 14:
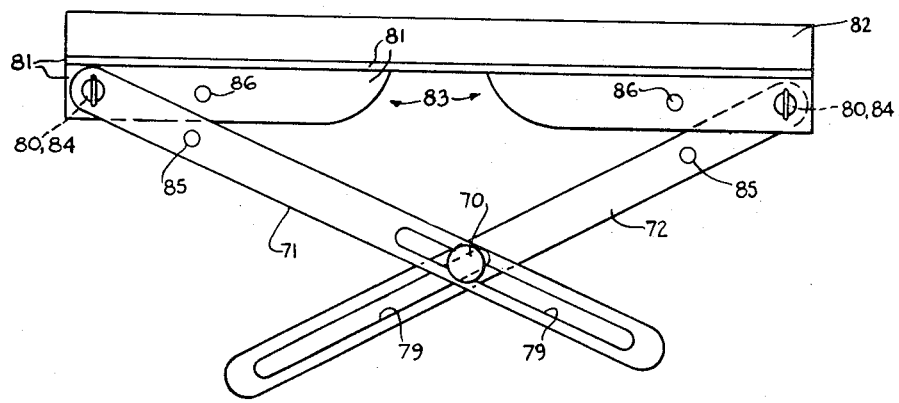

A modified form of aligning arrangement adapted for use with a conventional ball and socket hitch is shown in FIGS. 13, 14 and 15. Referring to FIG. 14, the hitch ball 70 will be understood to be trailer-supported as by being still connected to its socket secured to the trailer at the end of its tow tongue, for instance. Aligning arms 71 and 72 are supported from the ball 70 by an arrangement shown in FIG. 16.

The ball 70 is integral with a depending threaded stud 73 and passes down through an annular member 74 having reduced ends 75 and 76, the stud 73 being secured to the member 74 by an appropriate washer 77 and nut 78. Aligning arms 71 and 72 are each slotted at 79 at one end and the reduced ends 75 and 76 are inserted in the slots 79 on assembly as shown in FIG. 16. The other unslotted ends of arms 71 and 72 are provided with holes 80.

The tow-car portion of the hitch comprises an angle iron 81 secured to the car rear bumper 82, for example, the horizontally extending flange of the angle 81 being cut away at 83 and provided with holes 84 at either end. When the tow-car approaches the trailer, arms 71 and 72 are extended forward and holes 80 in the arms aligned with holes 84 in the angle 81. Clevis pins 60, such as shown in FIG. 7, are then inserted in the aligned holes 80 and 84 and the car is backed toward the trailer until the annular member 74 enters space 83. The slots 79 are of such length that when the member 74 reaches the end of one or the other of the slots the trailer tongue is moved to one side or the other and the hitch assumes the position shown in FIG. 13 with the ball centered against the angle 81.

Arms 71 and 72 are provided with clevis pin holes 85 at their unslotted ends and the angle is provided with similar holes 86 now aligned therewith and clevis pins 60 are inserted in the aligned holes, the clevis pins also passing through the slots 79 of the arms to lock ball 70 in place in relation to the angle 81.

In both the aligning arrangement shown in FIGS. 8–10, and the arrangement shown in FIGS. 13–16, a pair of slotted alignment arms are supported from the trailer portion of the hitch (although they could be supported from the car portion) by a vertically extending pivot member extending through the slots of both arms. Means are provided at transversely spaced points in the tow-car portion of the hitch for pivotally securing a respective end of each alignment arm thereto and the slots are equally spaced from the point at the end of each arm at which it is pivotally secured to one of the transversely spaced means on the car portion of the hitch a distance adapted to center the trailer with respect to the tow-car portion of the hitch when the car is moved toward the trailer.

The National Highway Safety Bureau estimates that a car pulling a trailer is four times more likely to be involved in an accident than one that is not and also estimates that, in the case of trailers, in twenty percent of accident cases the trailer hitch was a factor that contributed to the accident.

Most trailer hitches are of the ball and socket type and it will be noted that the hitch shown in FIGS. 13–16, the ball portion 70 is designed to be permanently secured to the socket portion which remains secured to the trailer. This allows the ball and socket combination to be kept properly lubricated and prevents the most frequent cause of wear in this joint which is the ball accidentally becoming covered with dirt when the trailer is uncoupled.

In the case of the hitch shown in FIGS. 8–10, the ball and socket is eliminated and the hitch has three pivot axes, one about the vertical axis of tube 45 with a 360° range of turning, a second aligned transverse horizontal axis of the coaxially disposed clevis pins 60 securing the ears 57 and 59 together, and the third about the longitudinally and horizontally disposed pin 47. The range of movement about the second axis is limited but sufficient because of the space between foreportion 25 and the car 21. Motion about the third axis is limited to slightly less than 180°, which is more than sufficient, and limiting or dampening means may be provided by the shock absorbers 50.

In the trailer-car combinations 20–21 a hitch tube of any desired diameter may be provided for strength and of any desired length may be provided to compensate between tow-car heights. The heavy standard sedans of all makes are within 1 to 2 inches of a standard height.

As hereinabove noted the combination of the three axes of pivot counteracts any tendency of the trailer to overturn the tow-car when the one is at right angles to the other and the full 360° range around the first axis allows connecting the hitch or parking the trailer 20 with the tow-car headed toward the trailer so that the driver can see without looking behind.

I claim:

1. In a hitch for connecting two vehicles for towing, each vehicle bearing a portion of the hitch; apparatus for centering the hitch portion of one vehicle with respect to the hitch portion of the other when the vehicles are moved together, comprising: a pair of elongated arms each slotted longitudinally along one end, the arms being pivotally supported from one hitch portion by a pendant headed stud extending through the arm slots, the other hitch portion having an elongated transverse element having spaced holes therethrough one hole on each side of the center thereof, the holes being equally spaced from the center of the transverse element, and a pair of pins adapted to pivotally connect the unslotted ends of the arms to a respective hole in the transverse element, the pins in the unslotted ends of the arms being spaced from the respective arm slot a selected distance substantially equal to the spacing of the transverse element holes from the element center; whereby, when the vehicles are closely spaced and approximately aligned, the arms are pivotally connected by the pins to the transverse element and subsequently, when the vehicles are moved closer, the pendant stud meeting the end of a slot moves a vehicle transversely for exact alignment.

2. A hitch for connecting a trailer to an elongated transverse element at the rear of a towing vehicle, comprising: the forward end of the trailer having rotatably secured thereto the ball of a pendant ball-headed pin, a pair of elongated aligning arms, each arm being longitudinally slotted along one end, the ball pin extending down through the arm slots and having retaining means at its end for securing the arms pivotally to the ball pin, the transverse element having at least one horizontally disposed flange means, the flange means having a hole therethrough at each side of and equally spaced from the center of the element, the arms each having a hole through its unslotted end spaced from the slot a distance substantially equal to the spacing of the flange holes from the element center, pin means for securing the unslotted ends of the arms pivotally to the flange means through the arm and flange holes, and means for securing the arms to the flange means when the towing vehicle is moved to align the arms with the flange means.

3. In a combination of a tow vehicle and a towed vehicle, the tow vehicle having a portion bearing an upwardly projecting hitch ear at each side of the vehicle, the towed vehicle having a portion adapted to overlie the ear bearing portion of the tow vehicle, the overlying portion having a pendant hitch cross member secured thereto at its center so as to be rotatable with respect to the overlying portion about a substantially vertical axis, the cross member having a pair of forwardly projecting ears at either end adapted to receive therebetween a respective one of the upwardly projecting ears, the ears being adapted to be oscillatably secured together by a clevis pin through each pair of ears and the ear therebetween; hitch aligning means, comprising: a pair of aligning arms pendant from the hitch cross member at its center, each aligning arm being slotted at one end, a headed stud securing the arms to the cross member and passing through the slot of each arm, the unslotted end of each arm having a pendant pin projecting therefrom, the upwardly projecting ears of the tow vehicle being connected by a cross brace, the brace having a hole therein adjacent each upwardly projecting ear adapted to receive an arm pendant pin therein, the slot in each arm extending longitudinally of the arm and terminating at a distance from its pendant pin selected to align each pair of ears so as to embrace a respective tow vehicle ear therebetween when the pendant pins are placed in the brace holes and the tow vehicle is moved toward the towed vehicle.

* * * * *